Nov. 23, 1965 J. LITSIOS ETAL 3,218,782
SONIC DEFOAMING SYSTEM
Filed Sept. 12, 1962 9 Sheets-Sheet 1
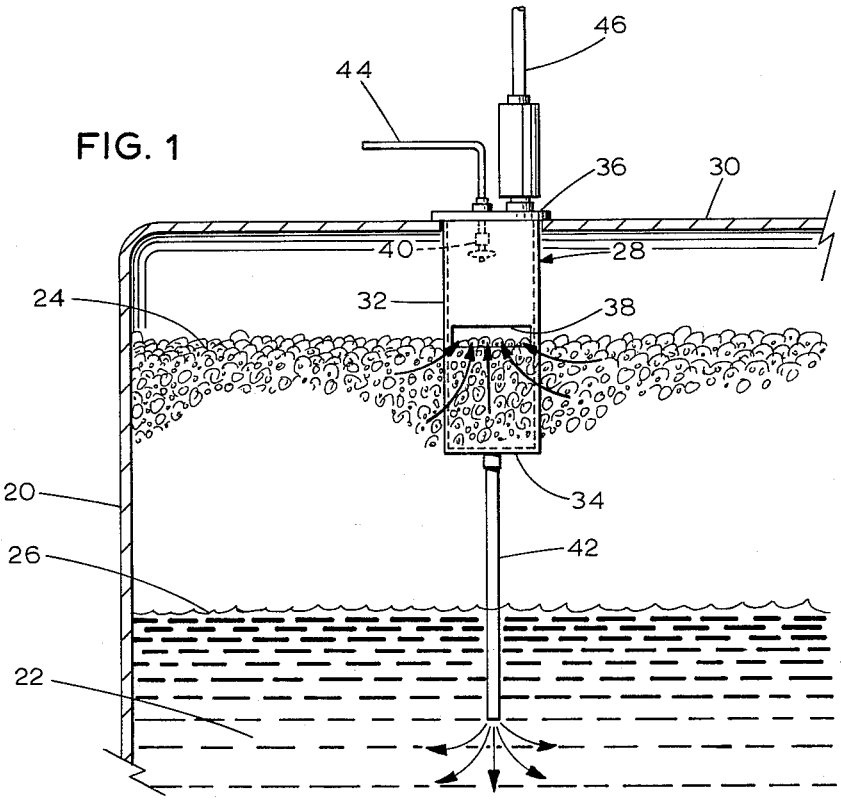
FIG. 1
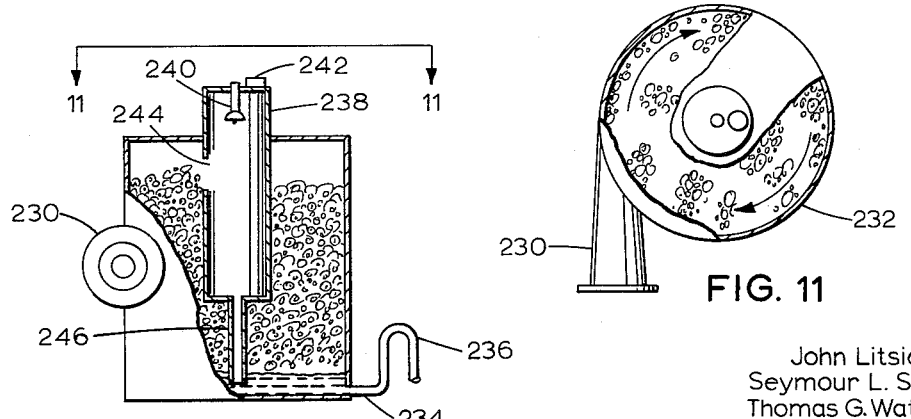
FIG. 12
FIG. 11
John Litsios
Seymour L. Spira
Thomas G. Watkins
INVENTORS
BY S.A. Giarratana
George B. Oujevolk
attorneys John Litsios
Seymour L. Spira
Thomas G. Watkins
INVENTORS BY S.A. Giarratana
George B. Oujevolk
attorneys Nov. 23, 1965    J. LITSIOS ETAL    3,218,782
SONIC DEFOAMING SYSTEM
Filed Sept. 12, 1962    9 Sheets-Sheet 6
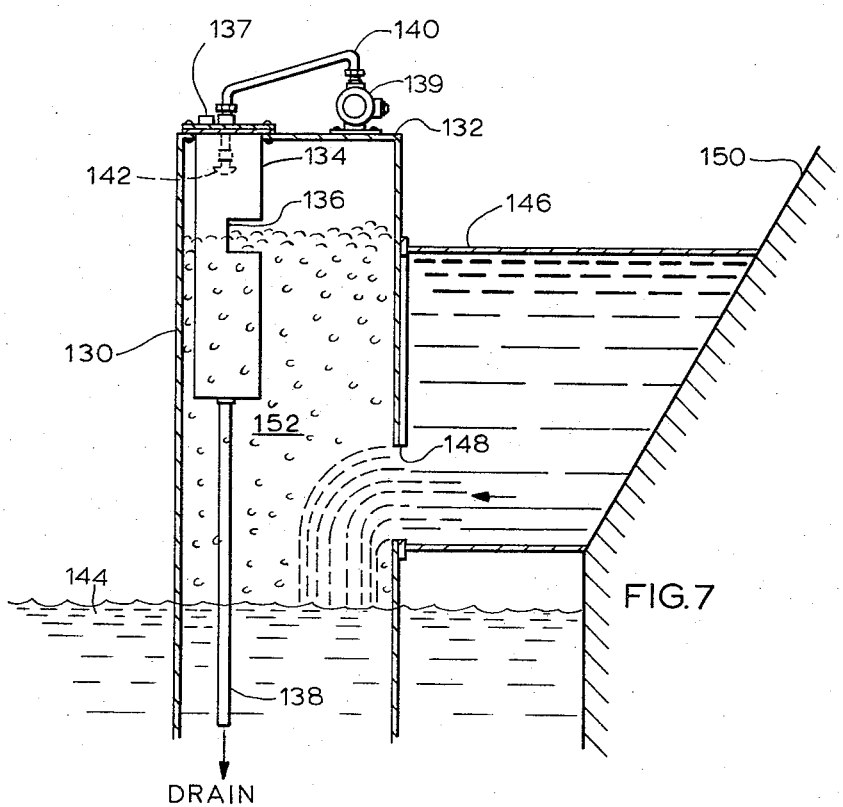
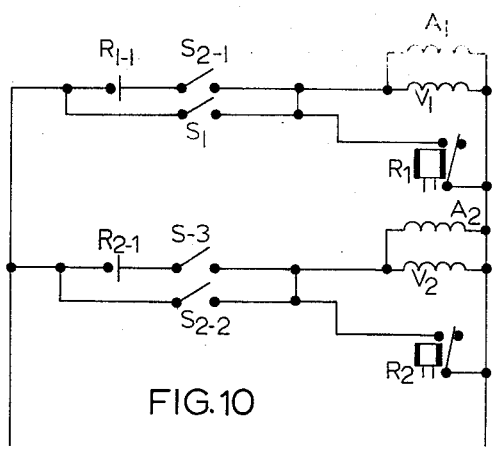
John Litsios
Seymour L. Spira
Thomas G. Watkins
INVENTORS.
BY S. A. Giarratana
George B. Oujevolk
attorneys Nov. 23, 1965    J. LITSIOS ETAL    3,218,782
SONIC DEFOAMING SYSTEM
Filed Sept. 12, 1962    9 Sheets-Sheet 7

John Litsios
Seymour L. Spira
Thomas G. Watkins
INVENTORS.

BY S. A. Giarratana
George B. Oiyevolk
attorneys

United States Patent Office 3,218,782
Patented Nov. 23, 1965

3,218,782
SONIC DEFOAMING SYSTEM
John Litsios, Tenafly, Seymour L. Spira, Glen Rock, and Thomas G. Watkins, Plainfield, N.J., assignors to General Precision, Inc., Little Falls, N.J., a corporation of Delaware
Filed Sept. 12, 1962, Ser. No. 223,006
2 Claims. (Cl. 55—164)

This invention relates to apparatus for destroying foam by sonic energy, and more particularly to sonic transducer and defoaming tank combinations for more effectively destroying foam.

There are many processes wherein a material undergoing treatment is stirred or aereated in a manner that creates large quantities of foam which must be destroyed. Examples of this range all the way from processing liquid detergents to growing antibiotic cultures. In the latter case, different cultures, such as penicillin, are grown in liquid media and transferred from one fermenter to another as production increases. The broth is continually agitated and oxygen is fed into the fermenters through air sparge pipes at the base of the vessel. As the antibiotic culture multiplies, the broth thickens, and given certain conditions foam is produced within the mixture by the air pumped through it. This foaming takes place without warning and cannot be controlled in the row product by varying the constituents, temperatures, or other production techniques.

It has been found that foam created in such processing applications can be destroyed by subjecting the foam surface to high intensity sonic energy. In methods used to date, foam is transported generally upward within a tube or walled container toward the sonic energy generator. When the uppermost surface of foam is exposed to the sonic energy, the film forming the bubbles is broken, allowing the trapped gas to escape. The remaining liquid flows generally downwardly via the walls of the following layers of foam bubbles.

The disadvantage of the old methods is that the defoamed liquid flows back down through the oncoming foam in a manner to increase the thickness of the film which forms the bubble, causing the walls of the bubbles to be stronger and more resistant to rupture when exposed to the sonic energy. Maximum capacity is reached when an equilibrium condition exists between available sonic energy, forward foam flow, and defoamed liquid counter flow.

In accordance with the present invention, the foam is delivered to a separate defoaming chamber having a sonic energy generator associated therewith to break the foam as it enters the chamber. The defoamed liquid drops to the bottom of the defoaming chamber and flows out of a drain pipe as a pure liquid which is not mixed with incoming foam. Released gas from the broken foam and discharged gas from the sonic energy generator are vented from the upper portion of the defoaming chamber. Since the liquid from the broken foam does not flow back through the oncoming foam but is drained off separately, the incoming foam is lighter, has a thinner wall, and can be broken easier, or at a greater rate for a given sonic energy generator output. The particular embodiments of the invention as will be described also lend themselves to systems where the objective is to draw off and collect the liquid or entrained solids in the foam structure as in foam fractionation processes.

Accordingly, it is one object of the present invention to provide an improved sonic defoaming system.

It is another object of the invention to provide a sonic defoaming apparatus wherein the defoamed liquid does not flow back through the oncoming foam.

It is a further object of the invention to provide a sonic defoaming apparatus wherein the foam is delivered to a separate defoaming chamber and broken by sonic energy as it enters the chamber and the defoamed liquid is drained from the bottom of the chamber without mixing with the main body of the foam outside the chamber.

It is a still further object of the invention to provide a sonic defoaming apparatus as described above which lends itself to the employment of a plurality of separate defoaming chambers to increase the rate at which the foam is destroyed.

It is still further object of the invention to provide a defoaming apparatus of the type described above wherein the foam is subjected to a centrifugal action to thin out the foam before it is introduced into the defoaming chamber and thus increase the defoaming rate.

It is a still further object of the invention to provide a defoaming apparatus which is relatively simple and economical to manufacture, easily assembled for cooperation with a supply of incoming foam, and effective and efficient in use.

Other objects and features of novelty of the present invention will be specifically pointed out or will otherwise become apparent when referring, for a better understanding of the invention, to the following description taken in conjunction with the accompanying drawings, wherein:

FIG. 1 is a fragmentary sectional view of a defoaming apparatus embodying features of the invention;

FIG. 7 is a sectional view taken along the line 7—7 of FIG. 6;

FIG. 10 is a schematic wiring diagram of a control circuit for the apparatus illustrated in FIGS. 8 and 9;

FIG. 11 is a plan view partially broken away of still another embodiment of the invention;

FIG. 12 is an elevational view, partially broken away, of the apparatus illustrated in FIG. 11;

Figure 2:
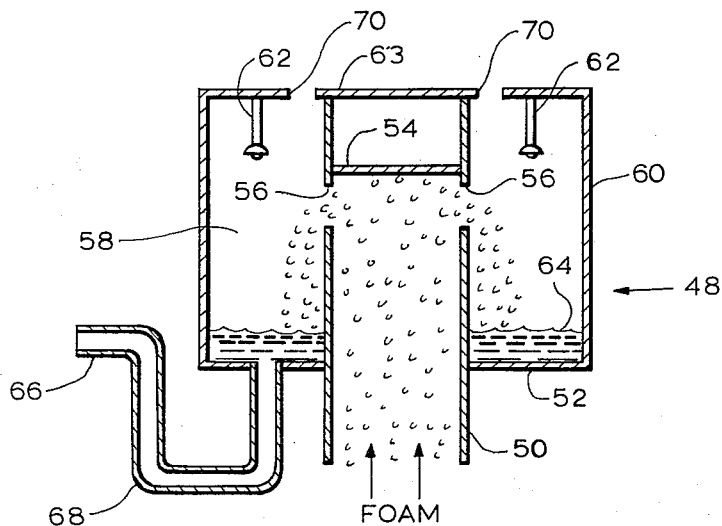
FIG. 2 is a schematic view illustrating another embodiment of the invention.

Referring to FIG. 1, a simplified version of a defoaming apparatus embodying features of the present invention is illustrated comprising a vessel 20 having a liquid 22 therein with a large quantity of foam 24 on the upper surface 26 of the liquid. A separate defoaming chamber 28 projects through and is supported by the top wall 30 of the vessel and comprises a cylindrical wall 32 closed at the lower end thereof by a disc-shaped bottom wall 34, and at the upper end thereof by a cover plate 36. An upper window 38 is formed in the cylindrical wall 32 between the ends thereof to admit the foam 24 into the chamber 28 for destruction by a sonic transducer 40 projecting into the chamber 28 from the cover plate 36. As the foam in the chamber is destroyed by the sonic energy, it collects at the bottom of the chamber and is delivered back into the liquid 22 by a drain pipe 42 extending from the bottom wall 34 of the chamber and projecting a sufficient distance into the liquid 22 to prevent the defoamed liquid from mixing with the foam on the upper surface of the liquid.

With this arrangement, the foam is broken up by the sonic energy produced by the transducer 40 as it enters the window 38 and the defoamed liquid is returned to the liquid 22 in the vessel without mixing with the main body of foam 24 in the vessel. Therefore the incoming foam is lighter, has a thinner wall, and can be broken more easily, or at a greater rate for a given sonic energy generator output. This has been sustained by actual tests which indicate an improvement of 70% to 80% using an arrangement similar to that of FIG. 1 as compared to an old arrangment wherein the foam is introduced directly into the bottom of a defoaming tube so as to rise upwardly therein until it is destroyed by a sonic transducer in the upper end of the tube with the defoamed liquid flowing back down through the oncoming foam. Also the diameter of the defoaming chamber 28 may be correlated with the particular sonic transducer 40 being used to provide the most efficient combination.

A stream or air supply line 44 is connected to the upper end of the sonic transducer 40 to deliver pressurized air or steam thereto for creating the sonic energy, and a vent pipe 46 is also mounted on the cover plate 36 to vent the released gas from the broken foam and the discharge gas from the sonic transducer 40. A silencer 47 may also be provided if desired to absorb the sonic energy which escapes out the vent pipe. The transducer 40 is conventional, and therefore will not be described in detail. However, it briefly comprises a pipe for delivering a pressurized gas such as air or dry steam to a nozzle having a stem projecting therefrom in position to support a resonator on the end thereof. Integral with the nozzle is a shock wave radiator constructed in a concave shape to radiate the sonic waves downwardly into the chamber 28. Other types of sonic energy generators which are capable of generating high energy levels with either audible or ultrasonic frequencies may also be employed, including sirens and electrically driven devices.

Referring to FIG. 2, another embodiment of the invention is illustrated schematically. It comprises a tank 48 having a large flanged conduit 50 extending upwardly through the bottom wall 52 thereof which can be connected to a vessel such as that illustrated in FIG. 1 to introduce foam into the tank. A plate 54 closes off the conduit near the upper end thereof and a plurality of openings 56 are formed in the wall of the conduit just below the plate 54 to enable the foam to escape radially outwardly into an annular chamber 58 defined between the cylindrical side wall 60 of the tank and the outer wall of the conduit. A plurality of sonic transducers 62 are circumferentially spaced about the top wall 63 of the tank 48 and project downwardly into the annular chamber 58 to destroy the foam as it enters the annular chamber through the openings 56 in the conduit 50. The defoamed liquid 64 collects in the bottom of the tank 48 and is drained off by a drain line 66 with a liquid trap 68 being provided to insure that only liquid is drawn off from the tank 48. A plurality of vent ports 70 are also provided in the top wall 62 of the tank 48 to vent the gases from the annular chamber 58, as previously described in connection with FIG. 1.

Figure 3:
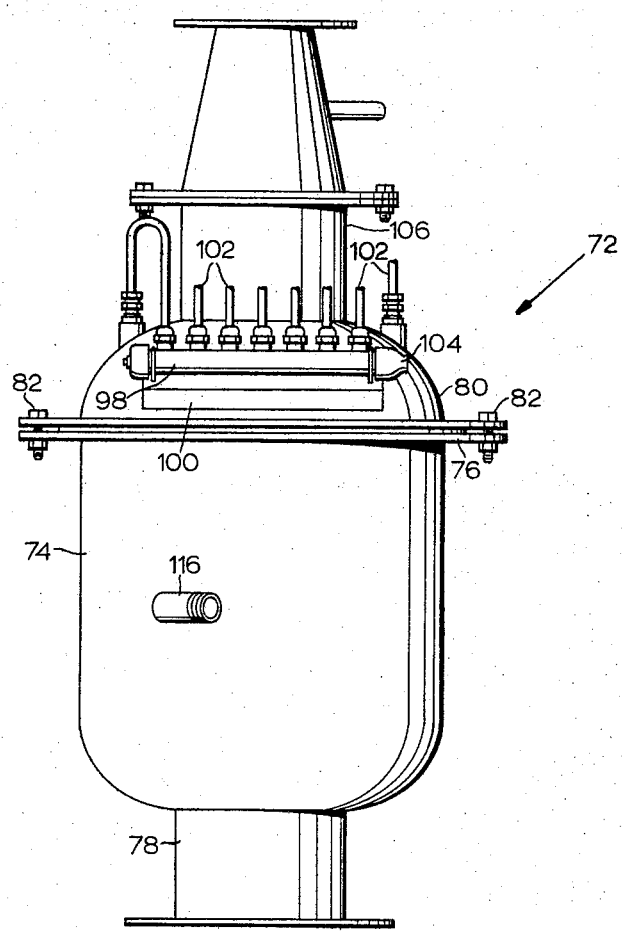
FIG. 3 is an elevational view of a defoaming apparatus for defoaming liquid as illustrated schematically in FIG. 2.
Figure 4:
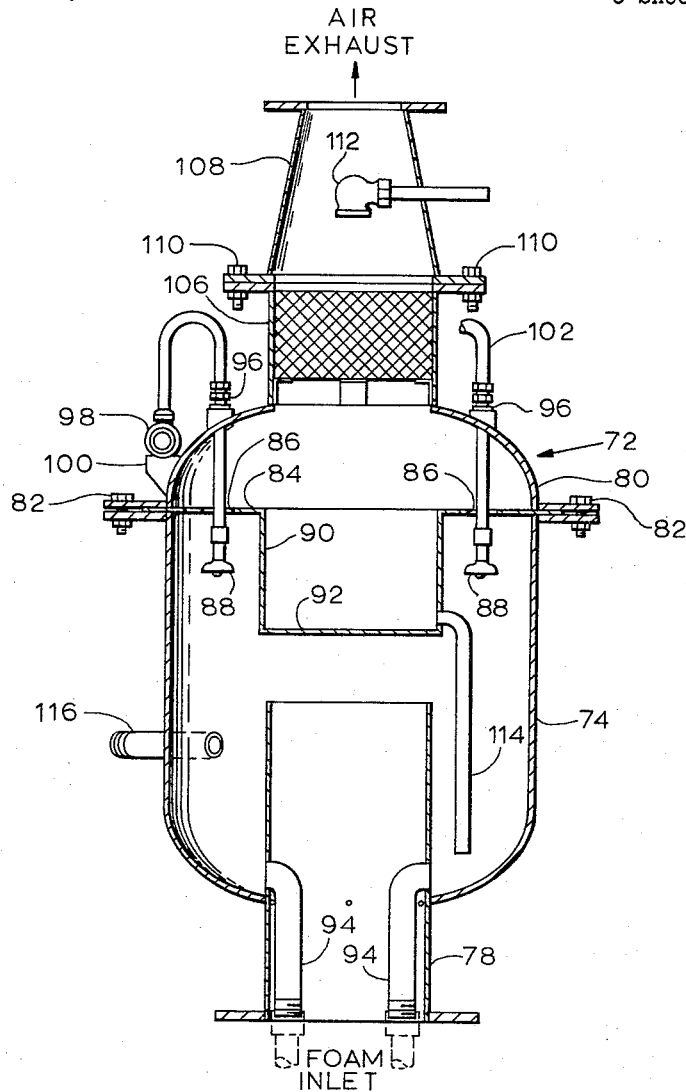
FIG. 4 is a longitudinal sectional view of the structure illustrated in FIG. 3.

Referring to FIGS. 3 and 4, a defoaming apparatus 72 is illustrated which destroys foam in a manner similar to that disclosed schematically in FIG. 2. The defoamer 72 comprises a cylindrical tank 74 having a flange 76 projecting radially from the upper end thereof. A flanged conduit 78 projects from the bottom of the tank and extends upwardly into the tank as illustrated in FIG. 4. The upper end of the tank 74 is closed by a flanged bell 80 bolted to the flange 76 by a plurality of bolts 82. A transverse partition 84 is clamped between the flanges and has a plurality of circumferentially spaced openings 86 therein through which a plurality of sonic transducers 88 project. The central portion of the partition 84 is depressed to provide a cylindrical wall 90 and a disc-shaped bottom wall 92 overlying the open upper end of the conduit 78.

With this construction, foam can be introduced upwardly through the conduit 78 so as to overflow into the tank 74 with the wall 92 acting as a baffle to deflect the foam radially outwardly into the tank. As the foam enters the annular chamber between the conduit 78 and the cylindrical wall of the tank, it is destroyed by the sonic energy produced by the sonic transducers 88 and the defoamed liquid settles in the bottom of the tank 74 where it can be removed by drain lines 94 separately from the foam rising upwardly through the conduit 78.

Each of the sonic transducers 88 project downwardly from fittings 96 supported on the outer surface of the bell 80 in circumferentially spaced relation. An air manifold 98 is supported on the side of the bell 80 by a support 100 and has a plurality of air lines 102 projecting therefrom and connected to different ones of the fittings 96 to deliver pressurized air to each of the sonic transducers 88, a suitable fitting 104 being provided on the right end of the manifold 98 as viewed in FIG. 3 to facilitate connection of the manifold to a source of pressurized air or steam.

A mist eliminator 106 projects upwardly from the top of the bell 80 and a flanged exhaust conduit 108 is bolted thereto by a plurality of bolts 110 to enable gases in the tank 74 to be vented, the gases escaping from the tank through the openings 86 into the bell 80 and then out through the mist eliminator 106 and exhaust conduit 108. A spray nozzle 112 projects into the exhaust conduit 108 for spraying a small amount of makeup liquid into the mist eliminator 106 from which it drains downwardly into the depression formed by the cylindrical wall 92 and thence out through a drain pipe 114 which terminates closely adjacent to the bottom of the tank 74 to deliver the liquid directly into the defoamed liquid collected in the bottom of the tank. Another pipe 116 is mounted on the side of the tank 74 in position to introduce additional makeup liquid into the tank if necessary.

Figure 5:
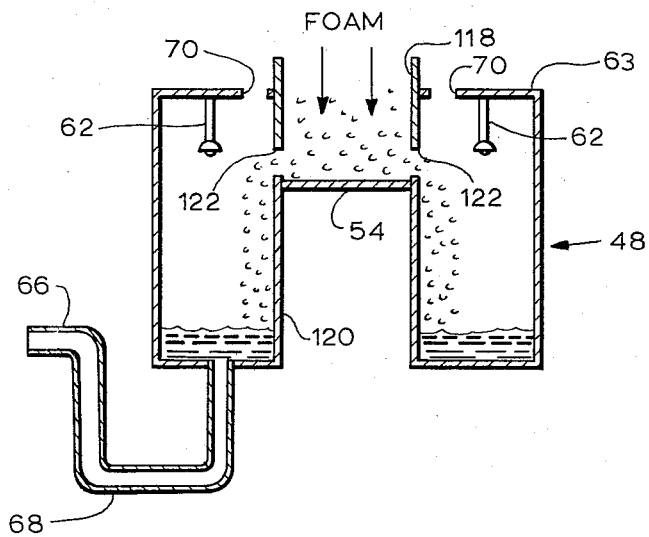
FIG. 5 is a schematic view similar to that of FIG. 2 illustrating a modification thereof.

Referring to FIG. 5, a modification of the structure illustrated schematically in FIG. 2 is shown wherein the foam is introduced downwardly into the tank 48 through a conduit 118 projecting through the center of the top wall 63 of the tank. The baffle 54 is provided as before but is positioned on top of a cylindrical wall 120 projecting upwardly from the bottom of the tank. The foam escapes radially outwardly through openings 122 in the wall of the conduit 118, as previously described, so that it is destroyed by the sonic energy produced by the transducers 62. The vents 70 are also provided to vent gases and the drain line 66 and trap 68 for draining the defoamed liquid.

Figure 6:
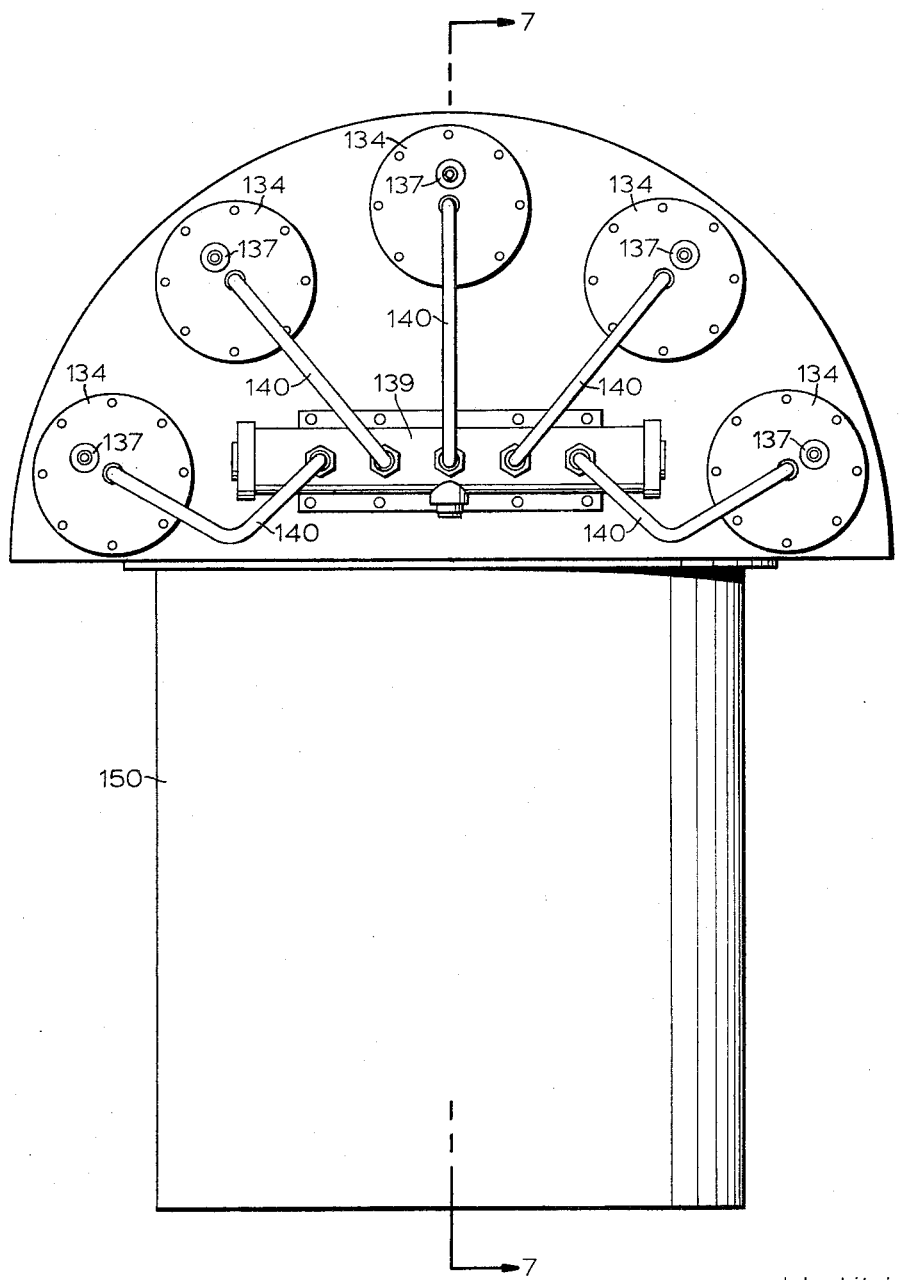
FIG. 6 is a plan view of another embodiment of the invention.

Referring to FIGS. 6 and 7, another modification of the present invention is shown which comprises a semi-cylindrical tank 130 having a top wall 132 closing off the upper end thereof but being open at the lower end thereof. A plurality of separate defoaming chambers 134 similar to the separate defoaming chamber 28 described in connection with FIG. 1 are supported on the top wall 132 and project downwardly into the tank 130 in circumferentially spaced relation. A window 136, vent 137 and a drain line 138 are provided in each of the defoaming chambers 134 as previously described. A manifold 139 is mounted on the top wall 132 with a plurality of air lines 140 projecting therefrom and communicating with each of said separate defoaming chambers 134 to energize the sonic transducers 142 projecting downwardly into the upper ends of the chamber.

With this construction, the open lower end of the semi-cylindrical tank 130 and the bottom of the drain line 138 can be submerged directly in a river 144 and additional liquid introduced into the river from a large sewer pipe 146 projecting from the embankment 150 of the river and connected to the flat wall of the tank 130. As the liquid pours into the tank through an opening 148, foam 152 is generated until it reaches the height of the windows 136 and can flow into the separate defoaming chambers 134 to be destroyed by the sonic energy generated by the transducers 142. The defoamed liquid drains from the bottom of the separate defoaming chambers 134 through the drain lines 138 directly back into the river 144 without passing through the foam 152. With this arrangement the sewer line 146 can overflow into the river without any foaming problem.

Figure 8:
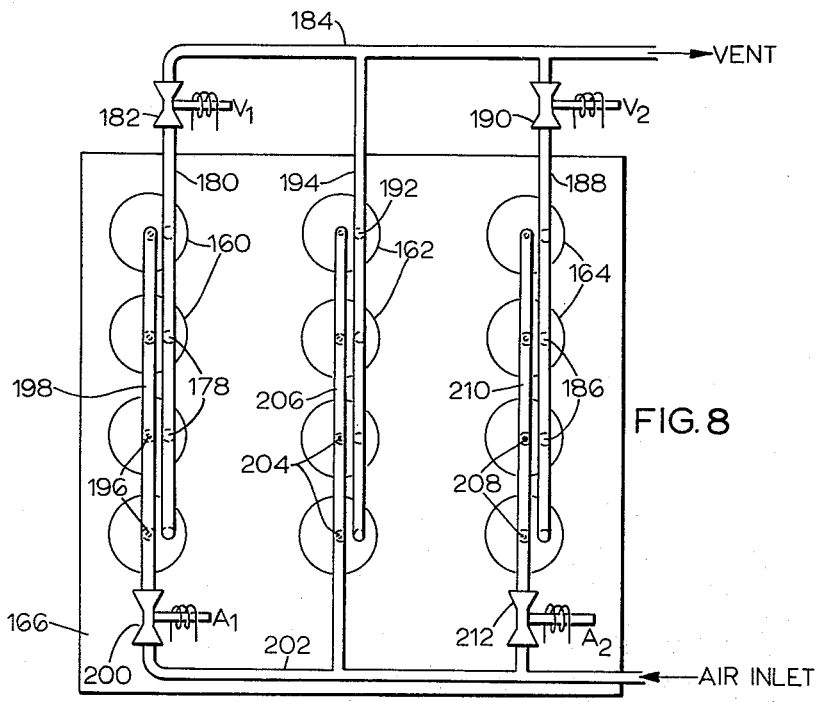
FIG. 8 is a schematic plan view of still another embodiment of the invention.
Figure 9:
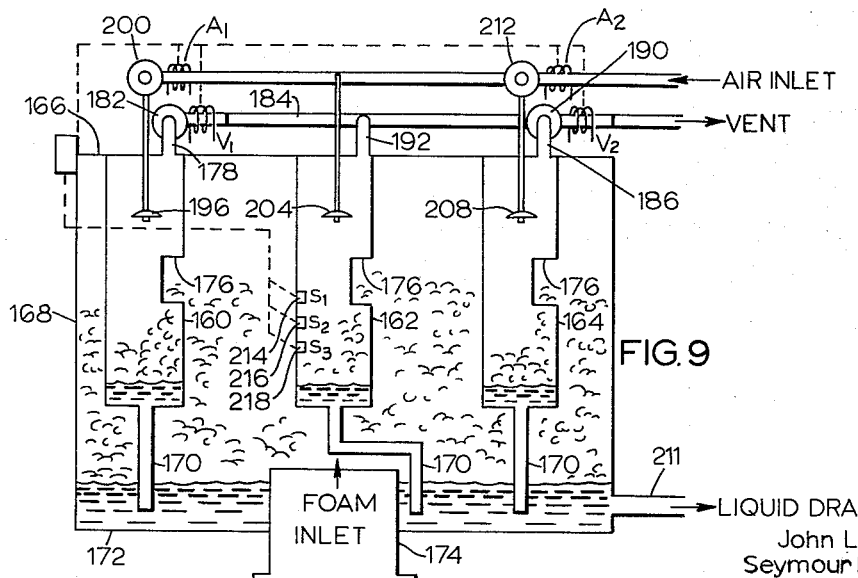
FIG. 9 is a front view of the apparatus illustrated in FIG. 8.

Referring to FIGS. 8 and 9, an embodiment of the invention employing multiple batteries of separate defoaming chambers 160, 162 and 164 is illustrated. Each of the defoaming chambers is suspended from a top wall 166 of a tank 168 similar to the manner previously described with drain pipes 170 extending downwardly from the lower ends thereof to a point closely adjacent to the bottom wall 172 of the tank. Foam is introduced into the tank through an inlet conduit 174 projecting upwardly through the bottom wall 172 and the foam is destroyed when it enters windows 176 in the separate defoaming chambers 160–164.

The defoaming chambers 160 each have a vent pipe 178 connected to a common manifold pipe 180 which in turn is connected to a solenoid-operated valve 182 for controlling the venting of the gases from the defoaming chambers 160 to a common vent pipe 184. Each of the separate defoaming chambers 164 have vent pipes 186 similarly connected to a common manifold pipe 188 which in turn is connected to a solenoid-operated valve 190 for controlling the exhausting of the gases to the common vent pipe 184. The defoaming chambers 162 have vent pipes 192 connected to a common manifold pipe 194 which is directly connected to the common vent pipe 184. Similarly, each of the sonic transducers 196 of the defoaming chambers 160 is connected to a manifold pipe 198 which is connected to a solenoid-operated valve 200 for controlling the delivery of pressurized air to the sonic transducers from a common air delivery pipe 202. The sonic transducer 204 of each of the defoaming chambers 162 is connected to a manifold pipe 206 which is directly connected to the air delivery pipe 202, and the sonic transducers 208 of the defoaming chambers 164 are connected to a manifold pipe 210 which is connected to the air delivery pipe 202 by a solenoid-operated valve 212. A drain line 211 is connected to the bottom of the tank 168 to drain off defoamed liquid collected in the bottom of the tank.

Three foam sensing probes 214, 216 and 218 are installed at different levels in one of the defoaming tubes 162 in the center row. Since the foam and liquid level in the defoaming chambers varies as a function of the rate of foam flow into the tube, the output of the foam sensing probes 214–218 may be utilized to turn on and off the banks of defoaming chambers 160 and 164 so that the power input to the entire defoaming installation in the form of the air supply to the sonic transducers can be modulated as a function of the foam load. It is also noted that foam will not enter the defoaming chambers 160 and 164 when the common vent pipes 180 and 188 are closed by the solenoid-operated valves 182 and 190, respectively.

Since the defoaming chambers 162 are connected directly to the common vent line 184 and air delivery line 202, they will operate continuously when pressurized air is introduced through line 202. However, when the height of the foam in the defoaming chamber 162 having the sensing probes therein reaches the foam sensing probe 218, the switch $S_3$ (FIG. 10) is closed but the solenoids $A_2$ and $V_2$ which control the valves 212 and 190 are not energized since contacts $R_{2-1}$ of relay $R_2$ remain open. When the foam reaches the foam sensing probe 216, switches $S_{2-2}$ and $S_{2-1}$ close. This energizes the solenoids $A_2$ and $V_2$ to bring the bank 164 into action and also energizes the relay $R_2$ to close the contacts $R_{2-1}$. When the foam reaches the foam sensing probe 214, switch $S_1$ closes to bring the bank 160 into action and energize the relay $R_1$ to close contacts $R_{1-1}$. When the foam level recedes to expose the foam sensing probe 214, switch $S_1$ opens but the bank 160 is not cut off until the foam sensing probe 216 is exposed to open contacts $S_{2-1}$ and de-energize the solenoids $A_1$ and $V_1$. The contacts $S_{2-2}$ also open when the foam sensing probe 216 is exposed but the bank 164 will not be deactivated until the foam sensing probe 218 is exposed to open the switch $S_3$.

Referring to FIGS. 11 and 12, an embodiment of the present invention is illustrated wherein foam is introduced at a high velocity through inlet conduit 230 into a cylindrical tank 232. The inlet conduit 230 is tangential to the cylindrical wall of the tank so that the foam rotates at a high speed within the tank in a clockwise direction as illustrated by the arrows in FIG. 11. The centrifugal force of the rotating mass causes liquid entrained in the foam bubble walls to be thrown to the outer periphery where it collects on the cylindrical wall of the tank and drains down to the bottom, where it is removed by a drain line 234 having a raised trap 236 so that the liquid in the tank must reach a predetermined height before it will drain out. A defoaming chamber 238 is concentrically mounted in the cylindrical tank 232 with the usual sonic transducer 240, vent outlet 242, window 244 and drain pipe 246 having the lower end thereof submerged in the liquid at the bottom of the tank.

As the entrained liquid collects at the cylindrical wall as just described, the remaining dry foam volume is gradually forced toward the center where it enters the window 244 of the defoaming chamber 238 and is sonically destroyed. The defoamed liquid passes out through the drain line 246 directly into the liquid in the bottom of the tank and the gas released from the foam bubbles and the transducer driving air is vented by the vent 242.

Although in FIGS. 11 and 12 the centrifugal tank 232 and the defoaming chamber 238 are illustrated as being directly connected together, the two units could be separate elements working together in a defoaming system. If desired, the centrifugal forces also could be developed mechanically by rotating the tank 232 with an external drive rather than introducing the foam tangentially at a high velocity.

Figure 13:
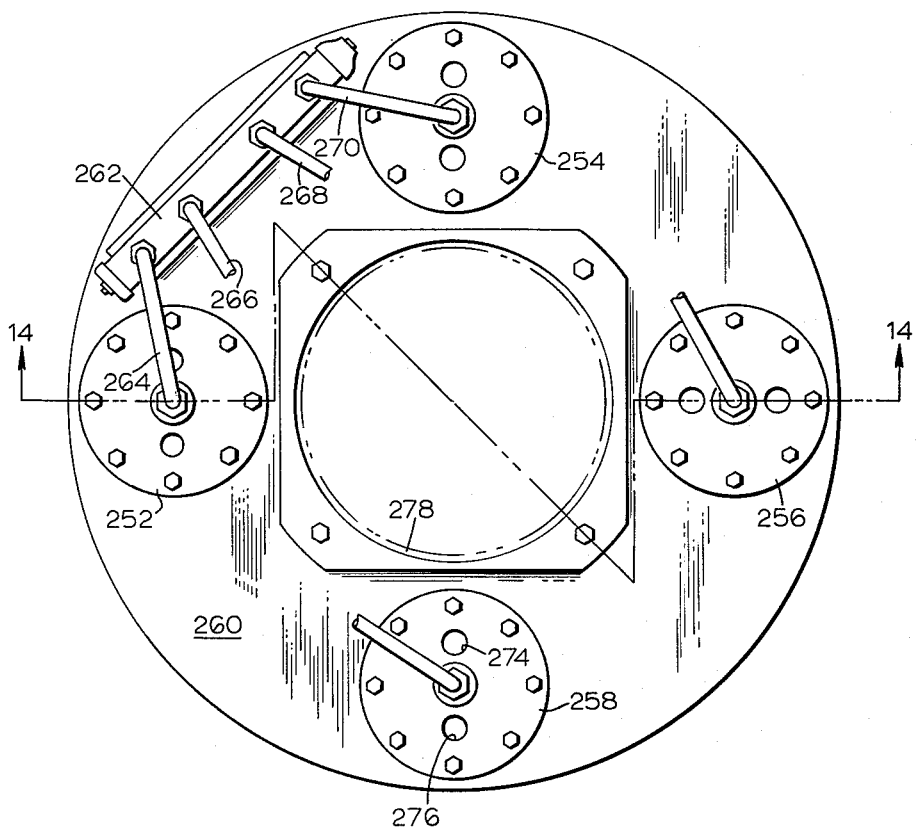
FIG. 13 is a plan view of still another embodiment of the invention.
Figure 14:
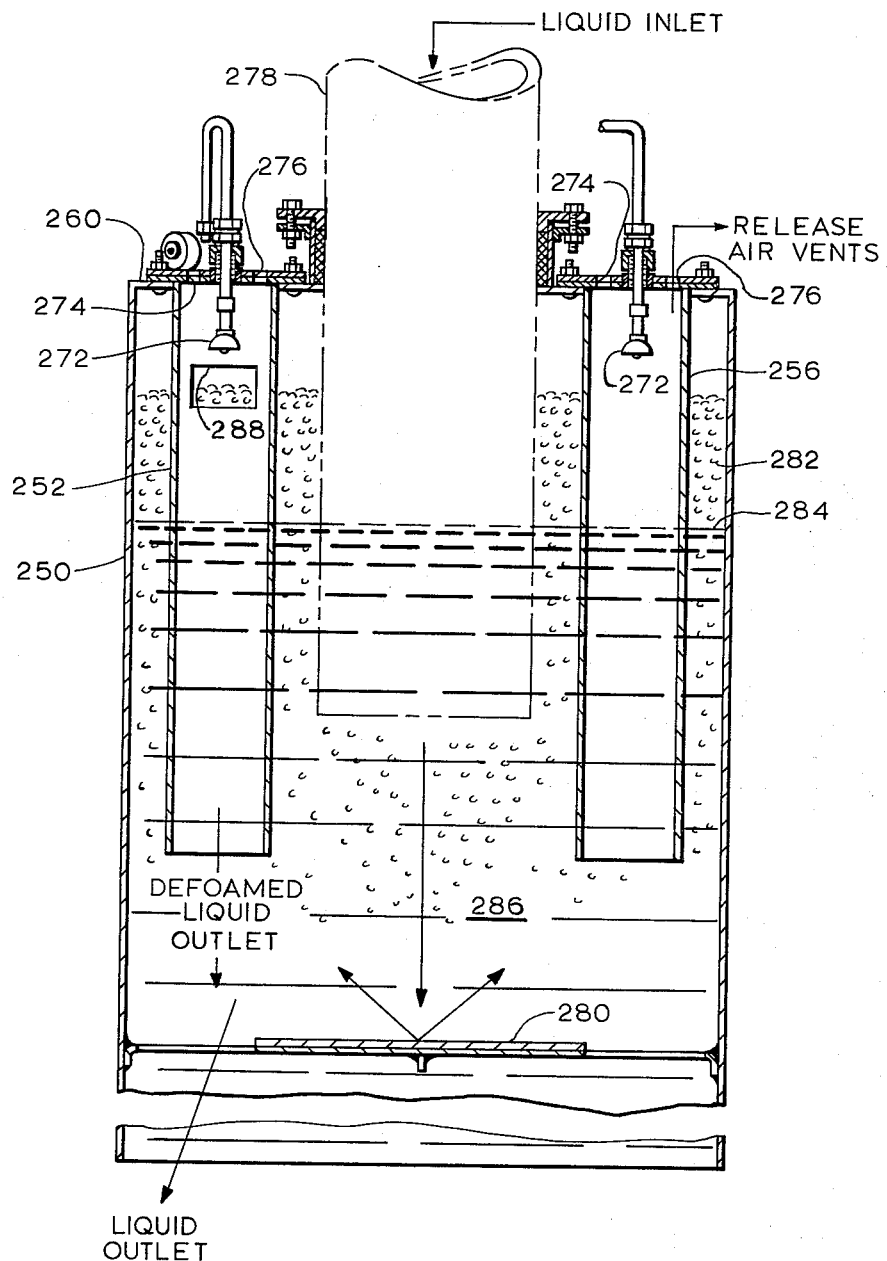
FIG. 14 is a sectional view taken on the line 14—14 of FIG. 13.

Referring to FIGS. 13 and 14, a final embodiment of the invention is illustrated which comprises a cylindrical tank 250 having a plurality of separate defoaming chambers 252–258 suspended therein from the top wall 260 of the tank in a manner similar to that previously described in connection with the other embodiments. An air supply manifold tank 262 is mounted on the top wall 260 with separate pipes 264–270 extending therefrom for delivering air to the sonic transducers 272 in each of the defoaming chambers 252–258. In this embodiment apertures 274 and 276 are provided in the top of each of the defoaming chambers to vent the air within the defoaming chambers and liquid is introduced into the tank by an inlet conduit 278 projecting through the top wall 260 downwardly into the tank.

A baffle 280 is suspended centrally in the tank above the bottom thereof and opposite the lower end of the liquid conduit 278 to deflect foam in the entering liquid upwardly. Foam 282 generated on the upper surface 284 of the liquid 286 enters the defoaming chambers 252–258 through windows 288 and is sonically destroyed as previously described. However, in this embodiment the lower ends of the defoaming chambers are completely open so that the interior thereof communicates directly with the liquid 286 well below the upper surface 284 so that as the foam is destroyed within the defoaming chambers, the defoamed liquid is delivered directly to the liquid which is substantially at the same level in the defoaming chambers as in the tank.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed:

1. A defoaming apparatus comprising a tank, a plurality of banks of elongated defoaming chambers substantially vertically supported within said tank, foam inlet means for introducing foam into said tank, sonic energy generating means in the upper end of each of said defoaming chambers, each of said defoaming chambers having a small lateral upper window in the side thereof for admitting foam from the tank into the defoaming chamber where it can be destroyed sonically, drain pipe means towards the bottom of the defoaming chamber substantially spaced from said window for communicating the bottom of each of said defoaming chambers with liquid collected on the bottom of said tank, vent means for venting the gases from each of said defoaming chambers, a plurality of vertically spaced foam sensing probes positioned within one of the defoaming chambers of one of said banks for detecting the level of foam within said one defoaming chamber, valve means for controlling the delivery of air to each of said sonic transducers and the venting of gases from each of said defoaming chambers, and control means for controlling said valve means in response to the actuation of said foam sensing probes to control the number of said banks in operation at one time.

2. A defoaming apparatus comprising a tank;

foam inlet means for introducing foam into said tank;

a plurality of banks of defoaming chambers substantially vertically supported within said tank;

sonic energy generating means in the upper end of each of said defoaming chambers;

windows in each of said defoaming chambers in the side thereof for admitting foam from the tank into the defoaming chamber where it can be destroyed sonically;

drain means for communicating the bottom of each of said defoaming chambers with liquid collected on the bottom of said tank;

vent means for venting the gases from each of said defoaming chambers;

a plurality of air manifold pipes each connected to all of the sonic energy generating means of different ones of said banks of defoaming chambers;

a plurality of vent manifold pipes each connected to all of the vents of different ones of said banks;

an air inlet pipe connected to each of said air manifold pipes;

a common vent pipe connected to each of said vent manifold pipes;

solenoid-operated valve means connected to all but one of said air manifold pipes for controlling the delivery of pressurized air from said air inlet pipe into the air manifold pipes;

a solenoid-operated valve connected to all but one of said vent manifold pipes for controlling the venting of gases therefrom into said common vent pipe, said one air and vent manifold pipes being connected to the same bank;

a plurality of foam sensing probes vertically aligned in one of the defoaming chambers of said same bank; and, circuit means for controlling the opening and closing of said solenoid valves in response to actuation of said foam sensing probes to control the number of banks in operation in response to the level of foam in said one chamber.

References Cited by the Examiner

UNITED STATES PATENTS

| 2,184,195 | 12/1939 | Naucler | 252—361 X |
| 2,363,247 | 11/1944 | Holder | 55—15 X |
| 2,620,894 | 12/1952 | Peterson | 55—15 |
| 3,018,843 | 1/1962 | Mercier | 55—178 |
| 3,154,577 | 10/1964 | Carter et al. | 252—361 |
| 3,169,561 | 2/1965 | Berger et al. | 252—361 |

REUBEN FRIEDMAN, *Primary Examiner.*